G. A. CUTTER.
METHOD OF JOINING METAL.
APPLICATION FILED JUNE 14, 1918.

1,330,241.

Patented Feb. 10, 1920.

INVENTOR
George A. Cutter
BY
Townsend & Decker
ATTORNEYS

UNITED STATES PATENT OFFICE.

GEORGE ALBERT CUTTER, OF DEDHAM, MASSACHUSETTS, ASSIGNOR TO THOMSON SPOT WELDER COMPANY, OF BOSTON, MASSACHUSETTS, A CORPORATION OF MASSACHUSETTS.

METHOD OF JOINING METAL.

1,330,241.  Specification of Letters Patent.  Patented Feb. 10, 1920.

Application filed June 14, 1918. Serial No. 239,925.

*To all whom it may concern:*

Be it known that I, GEORGE ALBERT CUTTER, a citizen of the United States, and a resident of Dedham, in the county of Norfolk and Commonwealth of Massachusetts, have invented certain new and useful Improvements in Methods of Joining Metal, of which the following is a specification.

This invention relates to a method of joining metal plates and is analogous to riveting in that it is due to the intermediary of a separate blank or "rivet" that the plates are secured together.

In carrying out the invention the electric heating and welding process is utilized and the object of the invention is to quicken and cheapen, particularly quicken, the operation of joining plates together face to face.

The invention is particularly useful in joining ship plates as the objection to the necessity of alined holes, as in ordinary riveting, is obviated.

The invention consists in the improved method of joining metal plates face to face hereinafter more particularly described and then specified in the claims.

In the accompanying drawings Figure 1 is a cross-section through two plates assembled with a rivet blank to be joined in accordance with this invention.

Figure 1:
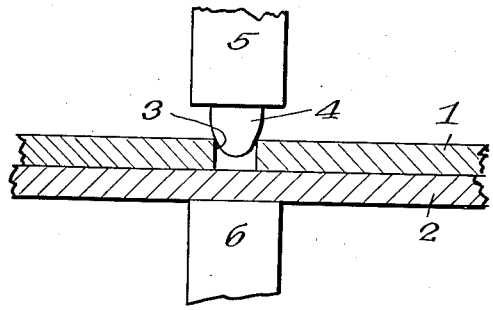

1 and 2 indicate the plates to be joined. They are first brought into surface contact with each other with the desired amount of overlap. One of the plates is provided with a perforation 3, the other plate being imperforate and preferably of smooth surface. 4 indicates the rivet blank by which the plates 1 and 2 are joined together.

The plates are assembled between the contact blocks or terminals 5, 6 of the transformer secondary of any desired type of electric welding machine, the contact 5 engaging the exposed end of the rivet blank 4 while the contact 6 bears against the outer surface of the plate 2. As will be well understood by those skilled in the electric welding art, the electric heating current passes from the contact 5 through the rivet blank 4 and plates 1 and 2 to the contact 6 and as the work softens pressure is applied in line with the rivet by means of said contacts.

The rivet blank 4 is preferably provided with tapered sides which in the initial stage of the operation engage only the outer edge of the perforation 3 as indicated in Fig. 1, the end of the blank not reaching so far into the perforation 3 as to engage, at this stage, with plate 2.

Figure 2:
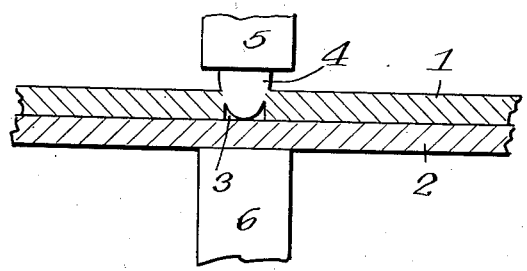
Fig. 2 is a similar view showing a subsequent stage in the operation.

Upon turning on the electric current, it flows from the terminal 5 across the restricted contact between the sides of the rivet and the perforation 3 through the plates 1 and 2 to the terminal 6 and softens the metal at the restricted contact which, upon the application of pressure by means of the terminal 5, breaks down and welds together and upon the continuation of the pressure the rivet blank is forced farther into the perforation and into engagement with the surface of the plate 2 as indicated in Fig. 2. The current will then mainly flow directly through the rivet to the plate 2.

Figure 3:
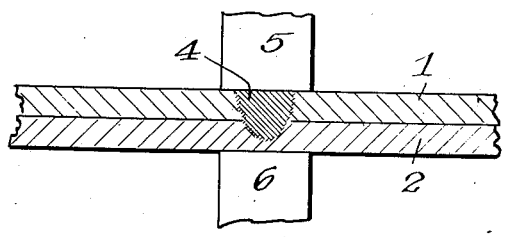
Fig. 3 is a similar view showing the operation completed.

Continuation of the current and pressure causes a softening of the metal at the place of contact between the end of the rivet 4 and the plate 2, the softening of the metal in the plate 1 around the walls of the rivet continuing and the rivet is forced down into the body of the plate 2. The operation is preferably although not necessarily continued until the outer end of the rivet is flush with the outer surface of the plate 1 at which time the plates are joined together by a homogeneous weld between the sides and end of the rivet and the plates as indicated in Fig. 3.

The sides of the rivet need not necessarily be tapered throughout their length and while the end of the rivet which contacts with the plate 2 is preferably rounded as shown in the drawings, it may take various other forms if desired.

By this method the necessity of alining the holes in both plates as in ordinary riveting operations is avoided. The tapered sides of the rivet not only provide the restricted area of contact with the plate 1 necessary to bring that plate to welding heat or to a sufficiently softened state to permit the forcing in of the rivet, but also serve to hold the plate 1 to the plate 2 effectively after the end of the rivet is welded to the plate 2.

The invention claimed is:—

1. The method of joining metal plates consisting in bringing the plates into surface contact, one at least of said plates being provided with a perforation from the outside of the perforated plate with its tapered sides engaging the edge of the perforation, inserting a tapered rivet blank in said perforation and welding the end of said rivet to the other plate.

2. The method of joining metal plates consisting in bringing the plates into surface contact, inserting a tapered rivet in a hole in one plate from the outside of the perforated plate with its tapered sides engaging the edge of the hole and welding the tapered sides of the rivet to the sides of said hole and the end of the rivet to the other plate.

3. The method of joining metal plates consisting in bringing the plates into surface contact, one at least of which has a perforation, inserting a tapered rivet blank into said perforation with its sides contacting with the edge thereof, applying a heating electric current and pressure to break down the contact between the rivet and edge of the perforation and continuing the heating current and pressure until the end of the rivet welds to the other plate.

4. The method of joining metal plates consisting in bringing the plates into surface contact, one at least being provided with a perforation, inserting a tapered rivet in said perforation from the outside of the perforated plate with the tapered sides of said rivet contacting with the edge of the perforation and welding the end of said rivet to the other plate whereby the plates are secured together by said weld and the shape of said rivet.

5. The method of joining metal plates consisting in bringing the plates into surface contact, inserting a rivet blank partially into a perforation in one plate, passing an electric current from one plate to the other through the rivet, applying pressure as the work softens to force the rivet end into contact with the other plate and continuing the current and pressure to effect a weld between the end of the rivet and the second named plate.

Signed at Boston, in the county of Suffolk and Commonwealth of Massachusetts, this twelfth day of June, A. D. 1918.

GEORGE ALBERT CUTTER.

Witnesses:
F. C. MILDRAM,
MARY E. BOYLE.